United States Patent
Shimano et al.

[11] Patent Number: 5,610,958
[45] Date of Patent: Mar. 11, 1997

[54] REACTOR CIRCULATING PUMP SYSTEM

[75] Inventors: Kunio Shimano, Yokosuka; Youichi Nakamura, Fujisawa; Osamu Ozaki, Tokyo; Iwao Ohshima, Kawasaki, all of Japan

[73] Assignee: Kabushiki Kaisha Toshiba, Kawasaki, Japan

[21] Appl. No.: 544,168

[22] Filed: Oct. 17, 1995

[30] Foreign Application Priority Data

Oct. 18, 1994 [JP] Japan ..................................... 6-251683

[51] Int. Cl.$^6$ ........................ G21C 15/18; G21C 15/243
[52] U.S. Cl. ............................................ 376/277; 417/411
[58] Field of Search .................................. 376/277, 402, 376/404, 406, 210, 211; 417/411, 45, 16, 374

[56] References Cited

U.S. PATENT DOCUMENTS

| | | | |
|---|---|---|---|
| 4,627,797 | 12/1986 | Rill, Jr. .................................... | 417/411 |
| 5,343,507 | 8/1994 | Arnold et al. .......................... | 376/277 |

FOREIGN PATENT DOCUMENTS

| | | |
|---|---|---|
| 2-38994 | 2/1990 | Japan . |
| 4-58591 | 9/1992 | Japan . |

*Primary Examiner*—Daniel D. Wasil
*Attorney, Agent, or Firm*—Oblon, Spivak, McClelland, Maier & Neustadt, P.C.

[57] ABSTRACT

A reactor circulating pump system comprises a pump and a power supply apparatus for driving the pump. In the power supply apparatus, an AC/DC converter and a DC/AC converter provided with an AC voltage/frequency adjuster are connected in series between an in-plant AC bus and a reactor circulating pump, a DC voltage adjuster, a superconducting energy storage apparatus and an excitation power supply source are connected to the input side of the DC/AC converter. A controller is incorporated in the power supply apparatus so as to receive a signal indicating instantaneous power failure or power breakdown on the in-plant AC bus, or reactor trip, and change an AC voltage supplied to the reactor circulating pump with a ratio of AC voltage and frequency kept constant for controlling a pump delivery rate to have a predetermined value, while holding an output voltage from the superconducting energy storage apparatus at a predetermined value.

10 Claims, 9 Drawing Sheets

TURNING-OFF OF
IN-PLANT POWER SUPPLY

TURNING-OFF OF
IN-PLANT POWER SUPPLY

REACTOR CIRCULATING PUMP SYSTEM

BACKGROUND OF THE INVENTION

The present invention relates to a reactor circulating pump system provided with a power supply apparatus for driving a coolant circulating pump of a nuclear reactor, more particularly, for preventing reactor accidents possibly occurred upon instantaneous power failure, power breakdown or reactor trip from causing.

In nuclear reactors, a system for controlling flow rate of a coolant circulated through the reactor is employed as one means for controlling a plant output power. Specifically, the flow rate control is performed by driving a reactor circulating pump by a frequency variable power supply apparatus and varying an output frequency of the power supply apparatus to change a rotational speed of the reactor circulating pump.

An M-G set (motor-generator set) having a fluid coupling variable in slippage is used as a conventional frequency variable power supply apparatus. A system block diagram of FIG. 9 shows a conventional reactor circulating pump system comprising a pump and a power supply apparatus for the same.

Figure 9:
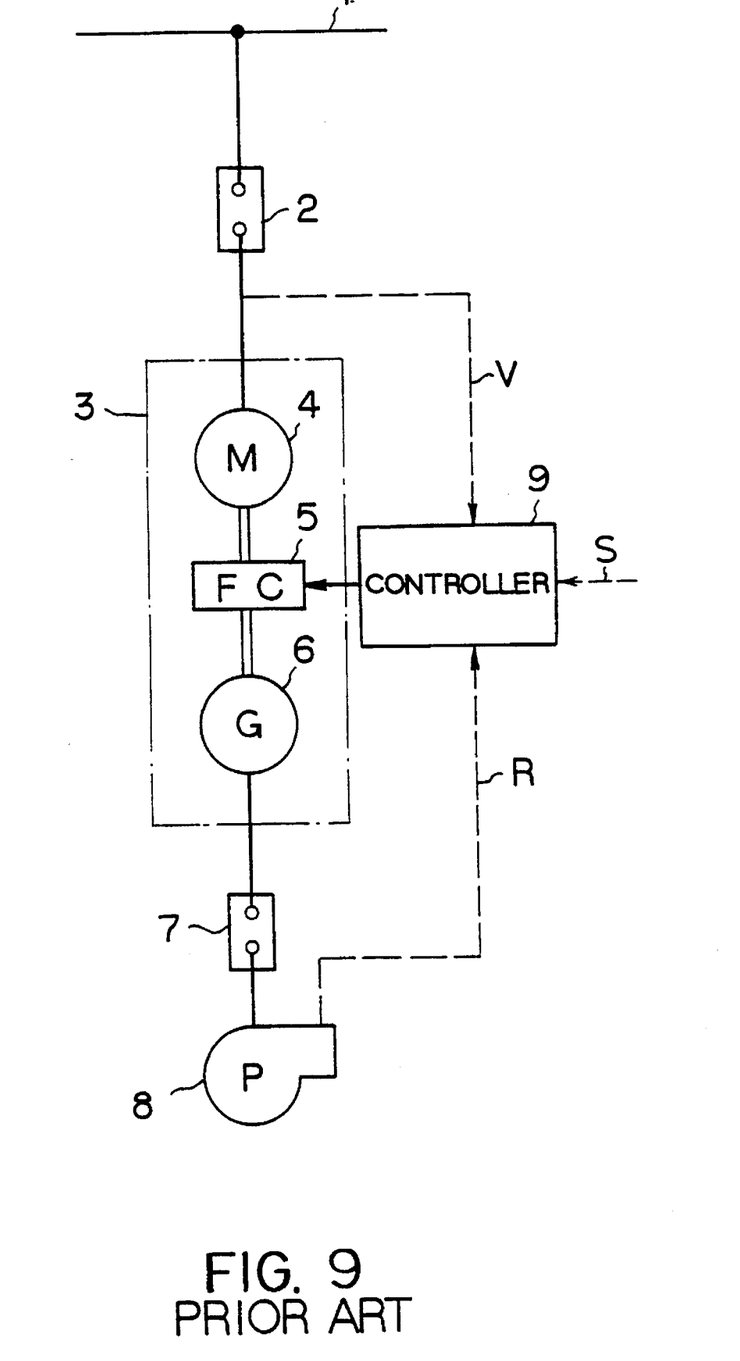
FIG. 9 is a system block diagram of a reactor circulating pump system provided with conventional power supply apparatus.

Referring to FIG. 9, an in-plant AC bus 1 is connected through a breaker 2 to an electric motor 4 as one of components making up the M-G set 3, the electric motor 4 being coupled to a generator 6 through a fluid coupling 5. The generator 6 is connected to a reactor circulating pump 8 through a breaker 7.

In a normal state, the reactor circulating pump 8 is operated to hold a predetermined flow rate while a signal R from the pump 8 indicating the rotational speed of the pump 8 or the flow rate of a coolant is monitored by a controller 9. However, when a signal V indicating a voltage drop due to instantaneous power failure or power breakdown on the in-plant AC bus 1, or a reactor trip signal S is input to the controller 9, the conventional system is controlled in such a manner as not to quickly reduce the voltage supplied to the reactor circulating pump 8 and hence not to cause an abrupt change in the flow rate due to a change in the rotational speed of the reactor circulating pump 8 by utilizing rotation inertial force of the M-G set 3.

The M-G set 3 as the power supply apparatus for the reactor circulating pump 8 has been problematic in having poor reliability because a response is slow and maintenance work is required for worn portions of the rotary equipment, and in limiting a reduction in size of the reactor building because a large installation space is necessary.

In view of the above matter, there is of late a tendency to employ a static voltage-variable, frequency-variable power supply apparatus comprising semiconductor devices which has a quick response and high reliability because of including no rotary portions. However, this static voltage variable, frequency-variable power supply apparatus accompanies a disadvantage of having no inertial effect unlike the conventional M-G set 3.

Accordingly, a compensating power supply apparatus is additionally needed to maintain desired operation characteristics of the reactor circulating pump 8 in the event of instantaneous power failure or power breakdown on the in-plant AC bus 1, or reactor trip. Storage batteries have heretofore been thought as being used as the compensating power supply apparatus. However, the use of storage batteries is disadvantageous in requiring an ample installation space and troublesome maintenance work such as charging the batteries.

SUMMARY OF THE INVENTION

An object of the present invention is to substantially eliminate defects or drawbacks encountered in the prior art and to provide a reactor circulating system including a power supply apparatus, provided with a superconducting energy storage means as a make-up power source, having a compact structure and being improved in safety and reliability.

This and other objects can be achieved according to the present invention by providing, in one aspect, a reactor circulating pump system comprising a pump unit for circulating a coolant in a reactor and a power supply apparatus operatively connected to the pump unit for driving the same, the power supply apparatus comprising:

an AC/DC converter and a DC/AC converter provided with an AC voltage/frequency adjuster connected in series between an in-plant AC bus and the pump unit;

a DC voltage adjuster operatively connected to the input side of the AC/DC converter;

a superconducting energy storage means operatively connected to the DC voltage adjuster;

an excitation power supply source operatively connected to the superconducting energy storage means; and a controller operatively connected to the pump unit, the DC voltage adjuster and the excitation power supply source and adapted to change an AC voltage supplied to the pump unit with a ratio of AC voltage and frequency kept constant in accordance with an information indicating accident thereby for controlling a pump delivery rate to have a predetermined value while holding an output voltage from the superconducting energy storage means at a predetermined value.

In preferred embodiments, the following characteristic features will be additionally attained.

The information indicating an accident is transmitted by a signal representing either one of instantaneous power failure and power breakdown on the in-plant AC bus and reactor trip.

The superconducting energy storage means is disposed between the DC voltage adjuster and the excitation power supply source.

The controller is adapted to change the AC voltage supplied to the pump unit with the ratio of the AC voltage and frequency kept constant for controlling the pump delivery rate to have the predetermined value while changing the output voltage from the superconducting energy storage means to a predetermined value.

The superconducting energy storage means connected to the input side of the DC/AC converter through the DC voltage adjuster is associated with a DC voltage adjuster and a DC/AC converter provided with an AC voltage/frequency adjuster adapted for a control power source and connected in series between an output side of the superconducting energy storage means and the controller.

Another superconducting energy storage means, a DC voltage adjuster and a DC/AC converter provided with an AC voltage/frequency adjuster all adapted for a control power source are connected between the excitation power supply source connected to the first mentioned superconducting energy storage means connected to the input side of the DC/AC converter through the DC voltage adjuster and the controller.

The superconducting energy storage means comprises an heat insulation vessel in which liquid helium fills, a superconducting coil immersed in the liquid helium and a current terminal to which the excitation power supply source and the superconducting coil are connected.

In another aspect of the present invention, there is provided a reactor circulating pump system comprising a pump unit for circulating a coolant in a reactor and a power supply apparatus operatively connected to the pump unit for driving the pump unit, the power supply apparatus comprising:

an excitation power supply source;

a superconducting energy storage means including a plurality of superconducting energy storage elements connected in parallel to each other;

an AC/DC converter;

a DC/AC converter provided with an AC voltage/frequency adjuster, the excitation power supply source, the superconducting energy storage means, the AC/CD converter and the DC/AC converter being connected in series between an in-plant AC bus and the pump unit with the excitation power supply source being on the in-plant AC bus side and the DC/AC converter being on the pump unit side; and a controller operatively connected to the in-plant AC bus side, the superconducting energy storage means and the pump unit so as to operate by turns to output a power for driving the pump unit, thereby holding a predetermined pump delivery rate in a normal state and to control the pump delivery rate to have a predetermined value in accordance with an information indicating an accident.

A plurality of breakers are arranged on input and output sides of the superconducting energy storage elements, respectively.

According to the characteristic features of the present invention described above through the preferred embodiment, when the signal indicating the instantaneous power failure or the power breakdown on the in-plant AC bus, or the reactor trip is input to the controller, the power stored in the superconducting energy storage means is extracted to hold the output DC voltage at the predetermined value for maintaining the delivery rate of the reactor circulating pump unit at the predetermined value in the event of the instantaneous power failure.

In the event of the power breakdown or reactor trip, the AC voltage supplied to the reactor circulating pump unit is changed with the ratio of AC voltage and frequency kept constant through the DC/AC converter provided with the AC voltage/frequency adjuster for controlling the pump delivery rate to have a predetermined value, while holding the output DC voltage at the predetermined value.

When the signal indicating the instantaneous power failure or the power breakdown on the in-plant AC bus, or the reactor trip is input to the controller, the power stored in the superconducting energy storage means is extracted to hold the output DC voltage at a predetermined value for maintaining the delivery rate of the reactor circulating pump unit at the predetermined value in the event of the instantaneous power failure.

In the event of the power breakdown or the reactor trip, the AC voltage supplied to the reactor circulating pump unit is changed with the ratio of AC voltage and frequency kept constant through the DC/AC converter provided with the AC voltage/frequency adjuster for controlling the pump delivery rate to have the predetermined value, while changing the output DC voltage in a predetermined manner.

When the signal indicating the instantaneous power failure or the power breakdown on the in-plant AC bus, or the reactor trip is input to the controller, power is supplied from the superconducting energy storage means to the reactor circulating pump unit.

Furthermore, since a predetermined control voltage is supplied to the controller through the DC voltage adjuster and the DC/AC converter provided with the AC voltage/frequency adjuster which are all adapted for a control source power, the pump delivery rate can be controlled in a predetermined manner even after the breakdown of the in-plant power supply.

When the signal indicating the instantaneous power failure or the power breakdown on the in-plant AC bus, or the reactor trip is input to the controller, a power is supplied from the superconducting energy storage means to the reactor circulating pump unit.

Furthermore, since a control voltage having predetermined AC voltage and frequency is supplied to the controller from the superconducting energy storage means through the DC voltage adjuster and the DC/AC converter provided with the AC voltage/frequency adjuster which are all adapted for a control source power, the pump delivery rate can be controlled in a predetermined manner even after breakdown of the in-plant power supply.

In another aspect, during the normal operation and in the event of the instantaneous power failure on the in-plant AC bus, a power is extracted from the plurality of superconducting energy storage elements by turns so that a predetermined DC voltage is supplied to the reactor circulating pump unit to continue the operation with the predetermined pump delivery rate.

In addition, in the event of the power breakdown on the in-plant AC bus or the reactor trip, the power extracted from the plurality of superconducting energy storage elements by turns is supplied to the reactor circulating pump unit for controlling the pump delivery rate to have the predetermined value.

The nature and further features of the present invention will be made more clear through the following descriptions made in conjunction with the accompanying drawings.

BRIEF DESCRIPTION OF THE DRAWINGS

In the accompanying drawings:

FIG. 3 is an operation characteristic chart according to the first embodiment of the present invention, in which

FIG. 4 is an operation characteristic chart according to a second embodiment of the present invention, in which

FIG. 8 is an operation characteristic chart according to the fifth embodiment of the present invention, in which

DESCRIPTION OF THE PREFERRED EMBODIMENTS

The present invention will be described hereunder by way of preferred embodiments with reference to the accompanying drawings, in which the same components as those used in the above-explained prior art of FIG. 9 are denoted by the same reference numerals and will not be described in detail below.

Figure 1:
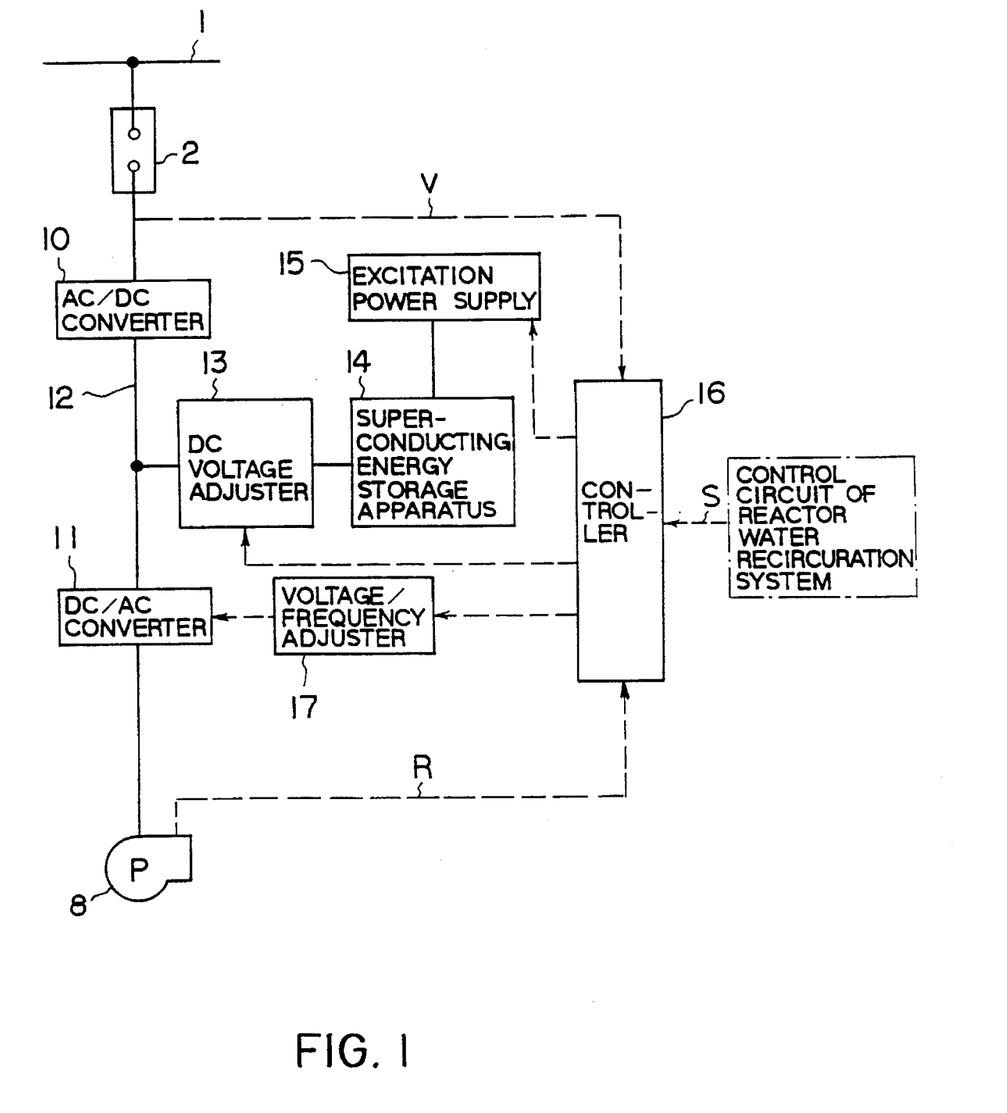
FIG. 1 is a system block diagram of a reactor circulating pump system having a power supply apparatus according to a first embodiment of the present invention.

FIG. 1 represents a first embodiment of a system block diagram of a reactor circulating pump system which comprises a pump unit and a power supply apparatus therefor and in which an in-plant AC bus 1 as an in-plant power supply is connected through a breaker 2 to an AC/DC converter 10 and a DC/AC converter 11 provided with an AC voltage/frequency adjuster. The DC/AC converter 11 is connected to a reactor circulating pump 8.

Connected to a DC wiring 12 interconnecting the AC/DC converter 10 and the DC/AC converter 11 are a DC voltage adjuster 13 and a superconducting energy storage apparatus 14 which supplies power to the reactor circulating pump 8 in the event of, e.g., instantaneous power failure or power breakdown on the in-plant AC bus 1, or reactor trip.

The superconducting energy storage apparatus 14 is associated with an excitation power supply 15 to which is supplied power from a separate power supply (not shown). A controller 16 receives a power drop signal V on the in-plant AC bus 1, a reactor trip signal S and a rotational speed signal R of the reactor circulating pump 8, and controls the DC voltage adjuster 13, the AC voltage/frequency adjuster 17 and the excitation power supply 15. The reactor trip signal S is usually a signal from a control circuit of a reactor water recirculation system.

The superconducting energy storage apparatus 14 is arranged as follows. As shown in a detailed structural diagram of FIG. 2, a current terminal 22 is connected through a lead 21 to a superconducting coil 20 which is housed in a heat insulation vessel such as cryostat 18 and immersed in liquid helium 19 for cooling. Connected to the current terminal 22 is the excitation power supply 15 from which a current is flown to the superconducting coil 20 for supplying electric power energy to be stored.

Figure 2:
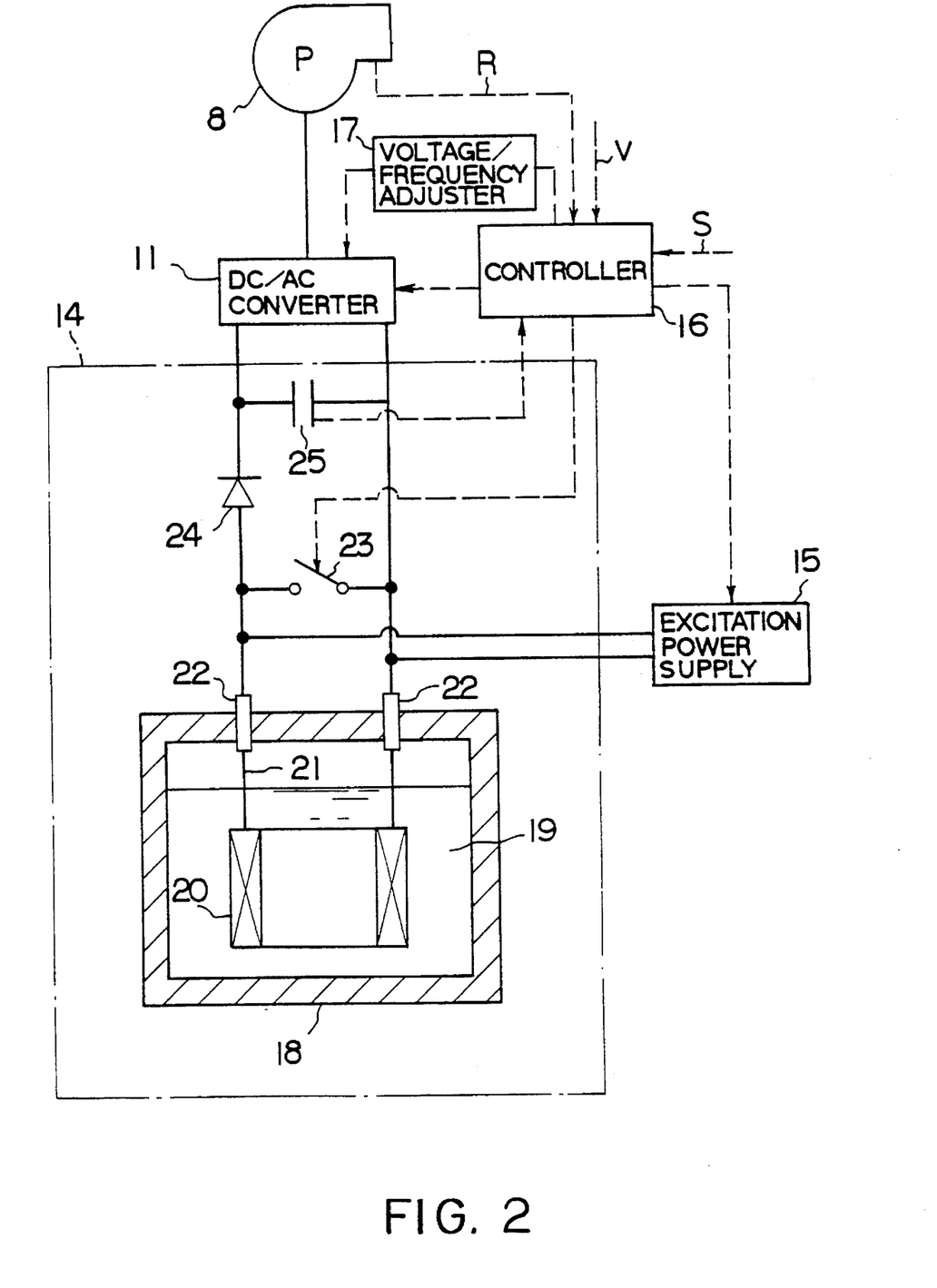
FIG. 2 is a detailed structural diagram of a superconducting energy storage apparatus according to the present invention.

Further, connected to the current terminal 22 are a switching device 23 selectively turned on or off to establish a closed circuit causing a current to flow through the superconducting coil 20 permanently or make the circuit open for allowing the current to flow toward the load, a diode 24 for causing the current taken out of the superconducting coil 20 to flow in a fixed direction, and a storage capacitor 25 for converting the current taken out of the superconducting coil 20 into a voltage.

The power of the direct current taken out of the superconducting coil 20 is converted into AC power by the DC/AC converter 11 and then supplied to the reactor circulating pump 8. The voltage and frequency of the AC power supplied to the reactor circulating pump 8 are adjusted to predetermined values by the AC voltage/frequency adjuster 17 under the control of the controller 16.

The first embodiment of the arrangement described above will operate as follows. In the superconducting energy storage apparatus 14, the superconducting coil 20 is excited by the excitation power supply 15 and cooled by the liquid helium 19 beforehand. The switching device 23 is closed in a superconducting state so that the superconducting energy storage apparatus 14 stores a great deal of electric power energy therein.

When the power drop signal V issued upon the instantaneous power failure or the power breakdown on the in-plant AC bus 1, or the reactor trip signal S is input to the controller 16 in the event of unusual power supplied to the reactor circulating pump 8, the switching device 23 in the superconducting energy storage apparatus 14 is made open and the power stored in the superconducting coil 20 is supplied to the reactor circulating pump 8 while being adjusted to the predetermined voltage and frequency by the DC/AC converter 11 and the AC voltage/frequency adjuster 17.

The above control is performed as follows. In the event of the instantaneous power failure, an AC power having the same voltage and frequency as those under the normal operation at that time is supplied to the reactor circulating pump 8 to maintain its normal operation. As soon as the in-plant power supply is returned to a normal state, the superconducting energy storage apparatus 14 is disconnected from the DC/AC converter 11 and charged with electricity by excitation from the excitation power supply 15 in view of the condition of the remaining electric power energy stored in the superconducting coil 20. Following that, the switching device 23 is closed for storage of resupplied electric power energy in a superconducting state again.

In the event of power breakdown and reactor trip, power is supplied to the reactor circulating pump 8 so that the pump is operated in accordance with a predetermined coasting-down characteristic of the flow rate. When the supply of power to the reactor circulating pump 8 is no longer required, the superconducting energy storage apparatus 14 is disconnected from the DC/AC converter 11 and then resupplied with electric power energy for storage in a superconducting state again.

Figure 3A:
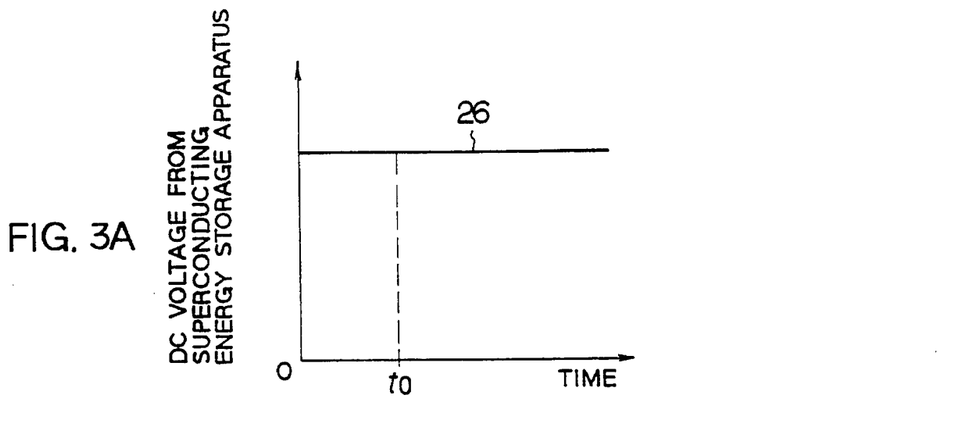
FIG. 3A represents a DC voltage.

The foregoing operation control with the superconducting energy will be described in more detail with reference to an operation characteristic chart of FIG. 3. As shown in FIG. 3A, the DC voltage output from the superconducting energy storage apparatus 14 is always held constant as indicated by a characteristic line 26.

Figure 3B:
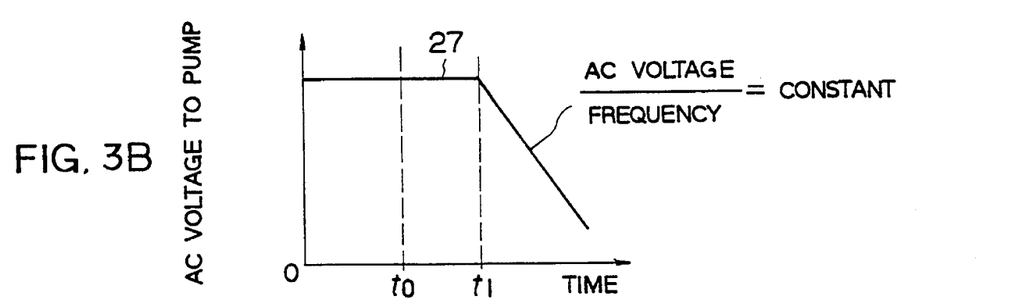
FIG. 3B represents an AC voltage and FIG. 3C represents a pump delivery rate.

On the other hand, as shown in FIG. 3B, the AC voltage supplied to the reactor circulating pump 8 is held at a predetermined value for a period from the time t0 at which the in-plant power supply is turned off to the time t1, and then gradually reduced at a predetermined drop rate after the time t1, while keeping the ratio of voltage to frequency constant as indicated by a characteristic line 27.

Figure 3C:
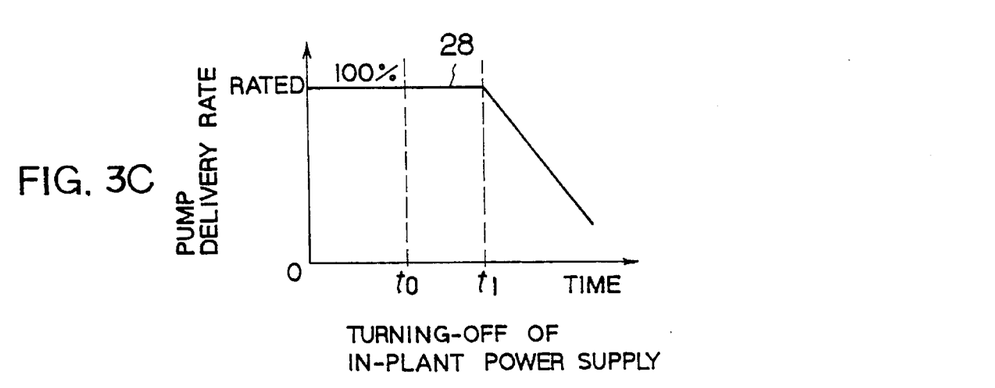

Accordingly, as indicated by a characteristic line 28 in FIG. 3C, the delivery rate of the reactor circulating pump 8 is held at a predetermined value for a period from the time t0 at which the in-plant power supply is turned off to the time t1. Therefore, if the in-plant power supply is turned off by the instantaneous power failure and restored within that period, the pump delivery rate is not changed.

In the event of the breakdown of the in-plant power supply or reactor trip, however, the pump delivery rate is reduced at the predetermined rate after the time t1 so that the flow rate changes in accordance with the predetermined coasting-down characteristic.

With the first embodiment, as described above, the superconducting energy storage apparatus 14 as a compensating power supply apparatus is compact, static, easy to carry out maintenance work, and highly reliable because of including no worn portions. Also, the superconducting energy storage apparatus 14 has a quick response in combination with a static voltage-variable, frequency-variable power supply apparatus made up of the AC/DC converter 10, the DC/AC converter 11 and so on. As a result, the reactor can be operated safely in an improved manner.

Further, a torque characteristic is held constant over a full range of rotational speed (delivery rate) of the reactor circulating pump 8 by controlling the AC power supplied to the reactor circulating pump 8 so that the ratio of the voltage frequency is kept constant. Consequently, the operation of the reactor circulating pump 8 can be controlled in a stable manner.

A second embodiment is a modification of the above first embodiment and is featured in that, using the same system arrangement as in the first embodiment, the controller 16 controls the DC voltage output from the superconducting energy storage apparatus 14 as shown in an operation characteristic chart of FIG. 4.

Figure 4A:
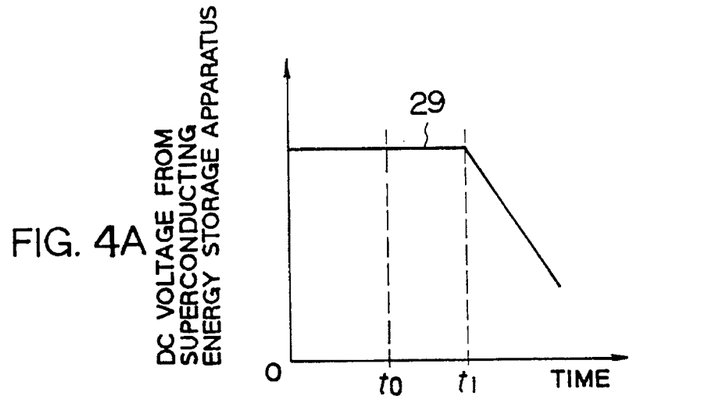
FIG. 4A represents a DC voltage.

As shown in FIG. 4A, the DC voltage output from the superconducting energy storage apparatus 14 is held at a predetermined value for a period from the time t0 at which the in-plant power supply is turned off to the time t1, and then gradually reduced at a predetermined drop rate after the time t1, as indicated by a characteristic line 29.

Figure 4B:
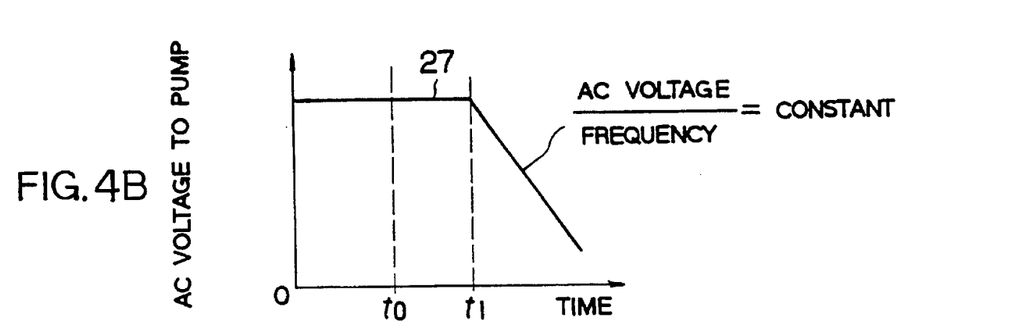
FIG. 4B represents an AC voltage and FIG. 4C represents a pump delivery rate.

Further, the AC voltage supplied to the reactor circulating pump 8 is held at a predetermined value for the period from the time t0 at which the in-plant power supply is turned off to the time t1, and then gradually reduced at a predetermined drop rate after the time t1, while keeping the ratio of voltage to frequency constant as indicated by a characteristic line 27 in FIG. 4B.

Figure 4C:
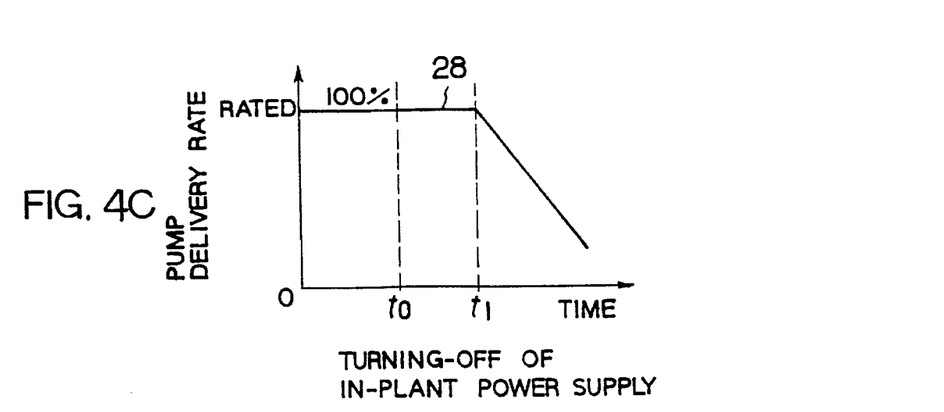

Accordingly, as indicated by a characteristic line 28 in FIG. 4C, the delivery rate of the reactor circulating pump 8 is held at a predetermined value before the time t1, and then gradually coasted down at a predetermined drop rate after the time t1.

With the second embodiment, therefore, the amount of power supplied from the superconducting energy storage apparatus 14 is reduced after the time t1. This is effective in reducing the size of the superconducting energy storage apparatus 14 and making it more compact.

Figure 5:
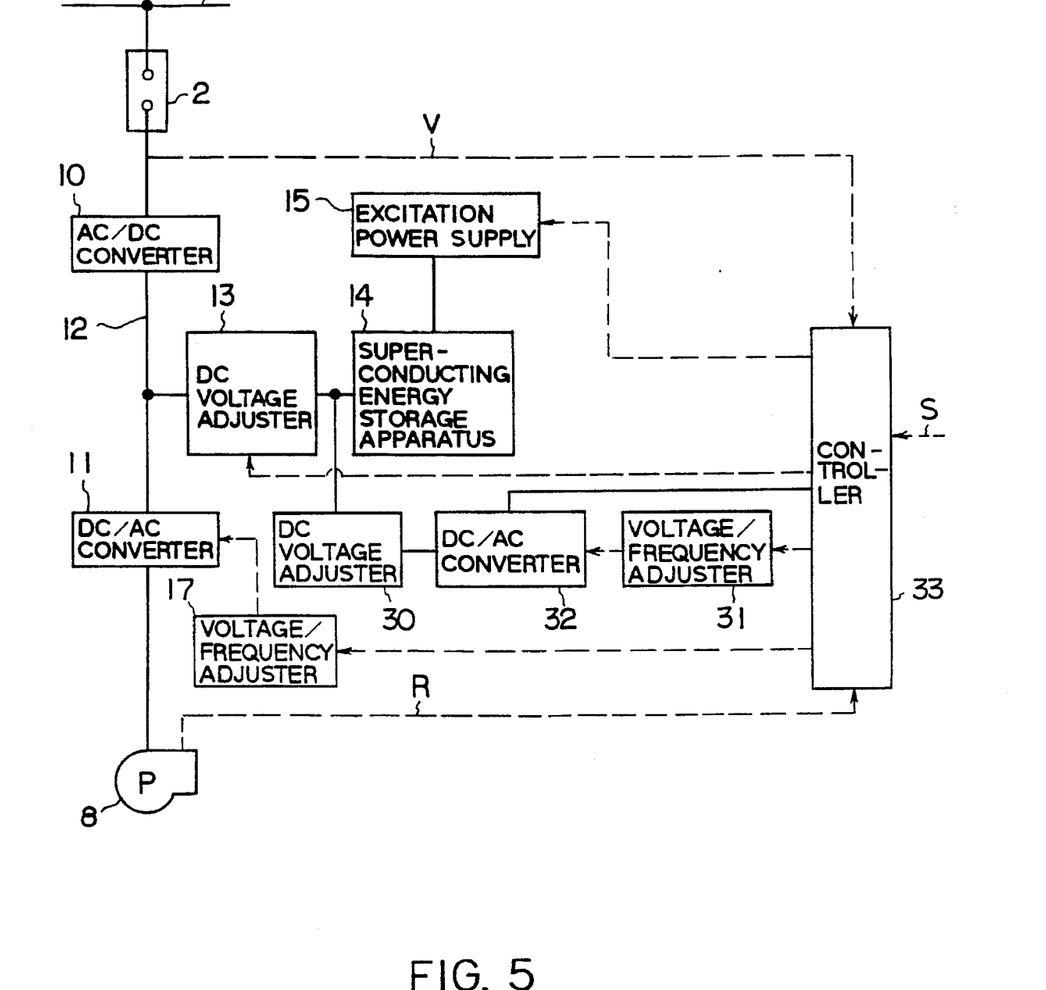
FIG. 5 is a system block diagram of a reactor circulating pump system having a power supply apparatus according to a third embodiment of the present invention.

A third embodiment is different from the above first embodiment shown in FIG. 1 in that, as shown in a system block diagram of FIG. 5, part of the DC current from the superconducting energy storage apparatus 14 is branched and connected to a controller 33 through a DC voltage adjuster 30 and a DC/AC converter 32 provided with an AC voltage/frequency adjuster 31 which are all adapted for control source power.

With the above arrangement, even during the breakdown of the in-plant power supply after turning-off thereof, the control source power necessary for the controller 33 is supplied from the superconducting energy storage apparatus 14 while being adjusted to have the predetermined AC voltage and frequency. Accordingly, the operation control of the power supply apparatus for the reactor circulating pump can be performed in a stable manner and the delivery rate of the reactor circulating pump 8 can be coasted down at the predetermined rate.

As a result, the third embodiment can eliminate the need of providing a separate emergency power supply such as a storage battery to operate the superconducting energy storage apparatus 14 and the controller 33 for controlling the same in the event of the instantaneous power failure or the power breakdown on the in-plant AC bus 1, or the reactor trip. This is effective in making the equipment more compact.

Figure 6:
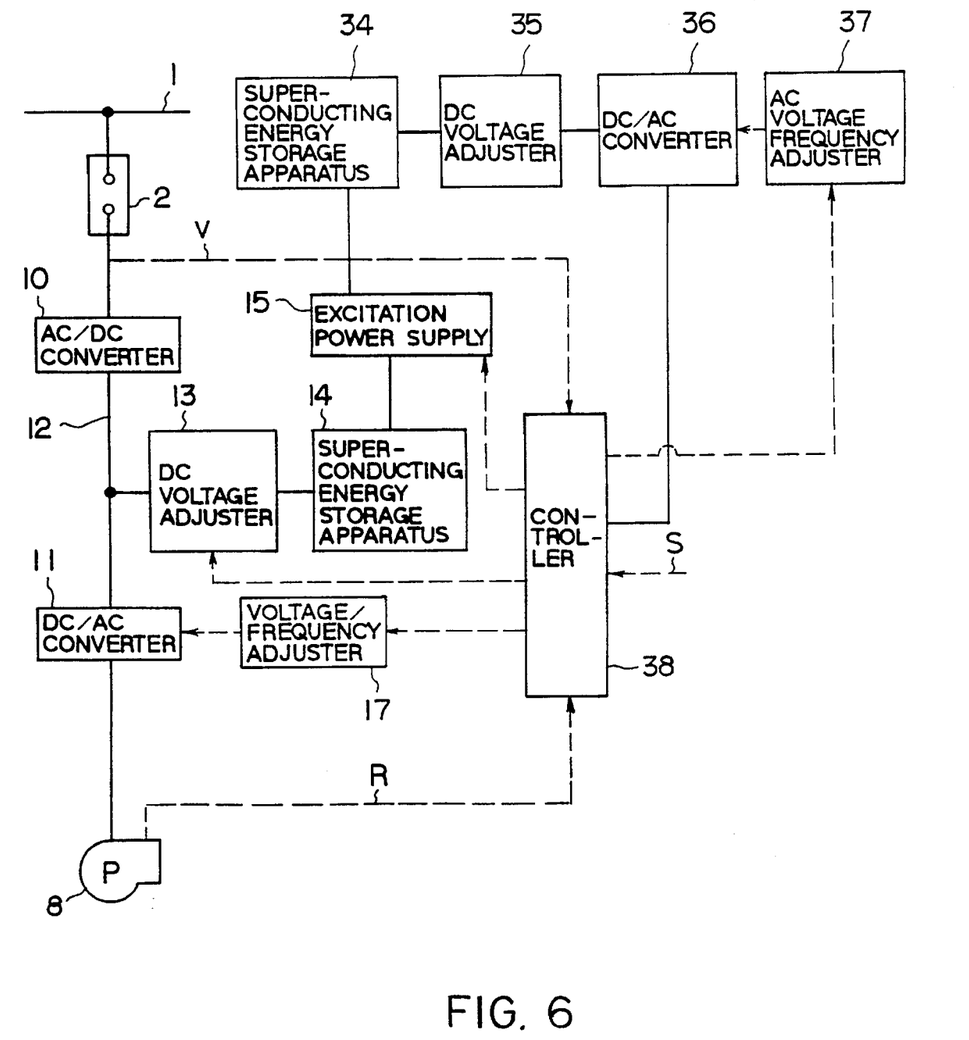
FIG. 6 is a system block diagram of a reactor circulating pump system having a power supply apparatus according to a fourth embodiment of the present invention.

A fourth embodiment is, as shown in a system block diagram of FIG. 6, a modification of the above third embodiment and is arranged such that, in addition to the superconducting energy storage apparatus 14 for supplying the power to the reactor circulating pump 8 shown in FIG. 1 representing the first embodiment, a further superconducting energy storage apparatus 34 for control source power, a DC voltage adjuster 35, a DC/AC converter 36, and an AC voltage/ frequency adjuster 37 are provided and connected to a controller 38.

With the above arrangement, in the event of the instantaneous power failure or power breakdown on the in-plant AC bus 1, or reactor trip, a source power for the controller 38 is supplied from the independent superconducting energy storage apparatus 34. Accordingly, even with the instantaneous power failure on the in-plant AC bus 1, the delivery rate of the reactor circulating pump is not changed. Furthermore, even with the power breakdown or reactor trip, the reactor circulating pump is operated to coast down the delivery rate, resulting in improved safety and reliability of the reactor operation.

Figure 7:
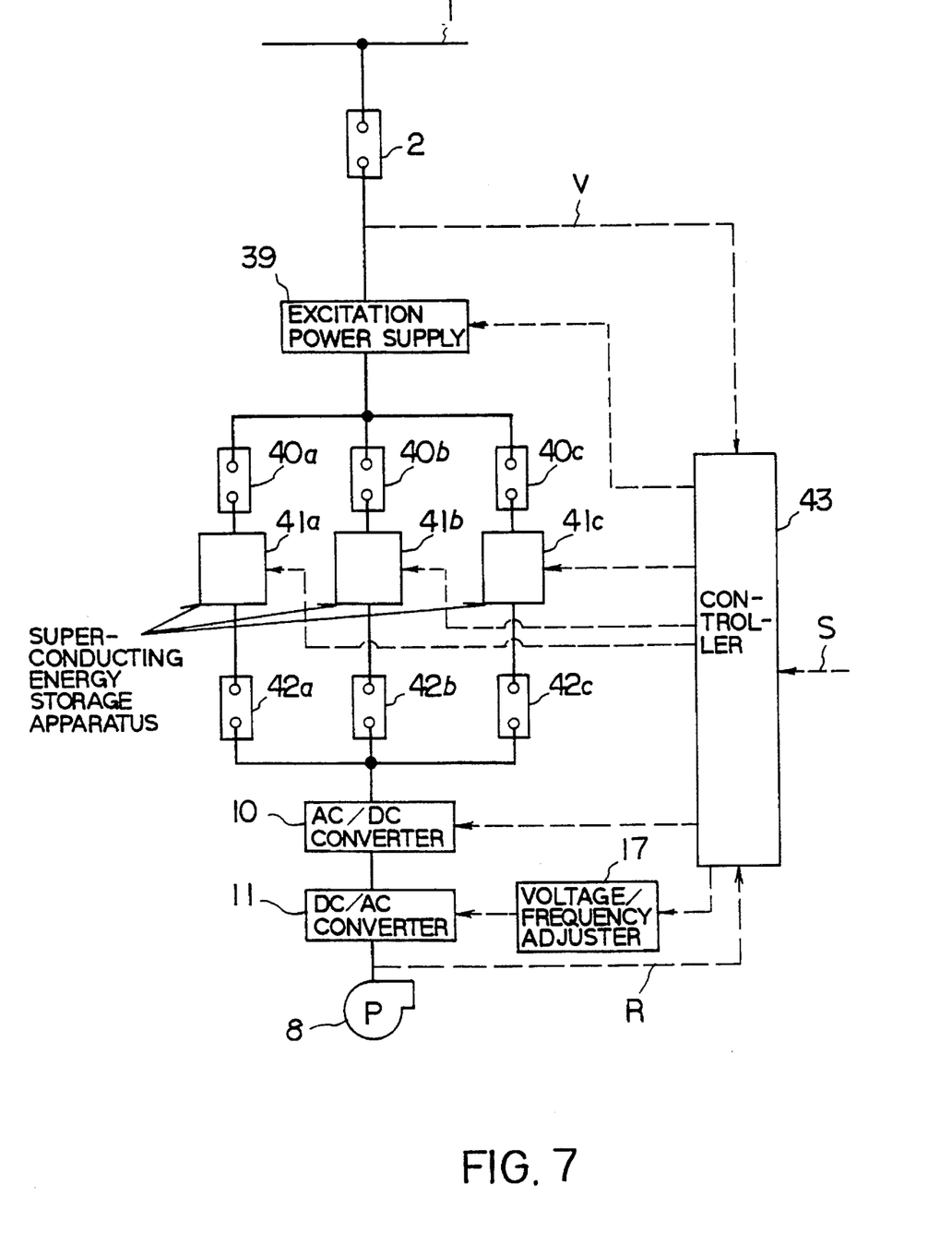
FIG. 7 is a system block diagram of a reactor circulating pump system having a power supply apparatus according to a fifth embodiment of the present invention.

A fifth embodiment is featured, as shown in a system block diagram of FIG. 7, in that a power for driving the reactor circulating pump 8 is supplied from multiple superconducting energy storage apparatus during both normal and abnormal operations.

The in-plant AC bus 1 is connected through the breaker 2 to an excitation power supply 39 of which output is branched and connected to superconducting energy storage apparatus 41a to 41c through respective breakers 40a to 40c.

Outputs of the superconducting energy storage apparatus 41a to 41c are collected together after passing respective breakers 42a to 42c, and then connected to the reactor circulating pump 8 through the AC/DC converter 10 and the DC/AC converter 11 which is controlled by the AC voltage/ frequency adjuster 17.

Respective control circuits for the above-mentioned components are connected to a controller 43 so that signals indicating conditions of those components are in turn output to the controller 43 and those components are controlled by command signals from the controller 43. In particular, the superconducting energy storage apparatus 41a to 41c are controlled so as to operate by turns to produce output power in a certain on/off cycle.

While the superconducting energy storage apparatus 41a to 41c are turned off, they are charged with the electric power energy from the excitation power supply 39 if the in-plant power supply is sound.

Figure 8A:
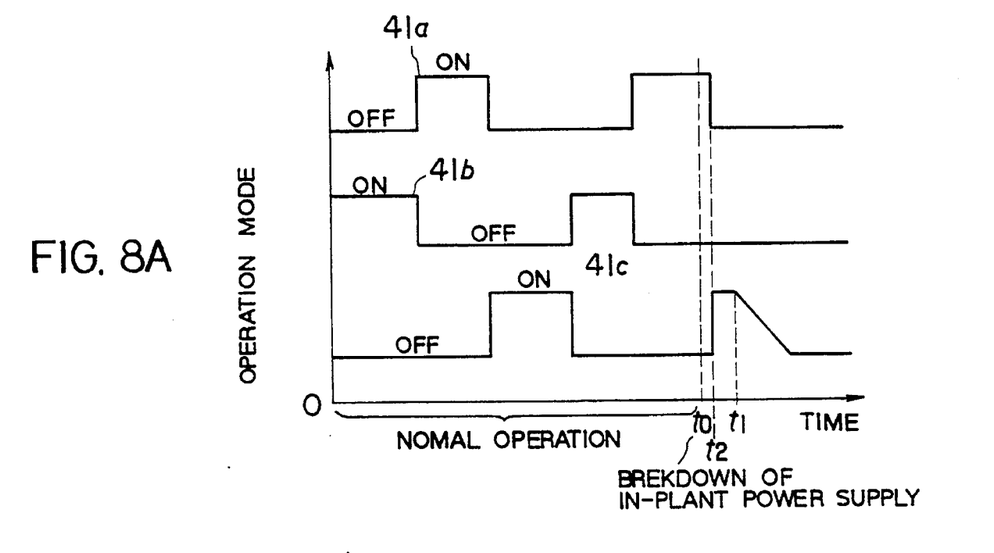
FIG. 8A represents operation modes of a plurality of superconducting energy storage apparatus and FIG. 8B represents a pump delivery rate.

The fifth embodiment of the arrangement described above will operate as follows with reference to an operation characteristic chart of FIG. 8, in which FIG. 8A shows operation modes of the superconducting energy storage apparatus 41a to 41c. Specifically, during the normal operation before the time to at which breakdown of the in-plant power supply occurs, the three superconducting energy storage apparatus 41a to 41c are operated by turns to produce output power in a repeated on/off cycle for supplying a continuous rated voltage to the reactor circulating pump 8.

In the event of a breakdown of the in-plant power supply, the superconducting energy storage apparatus 41a continues supplying the rated voltage at the time t0 at which breakdown of the in-plant power supply occurs. The superconducting energy storage apparatus is switched over from 41a to 41b at the subsequent time t2, but the rated voltage is continuously supplied to the reactor circulating pump 8. Then, after the time t1, the output voltage from the superconducting energy storage apparatus is gradually reduced.

Figure 8B:
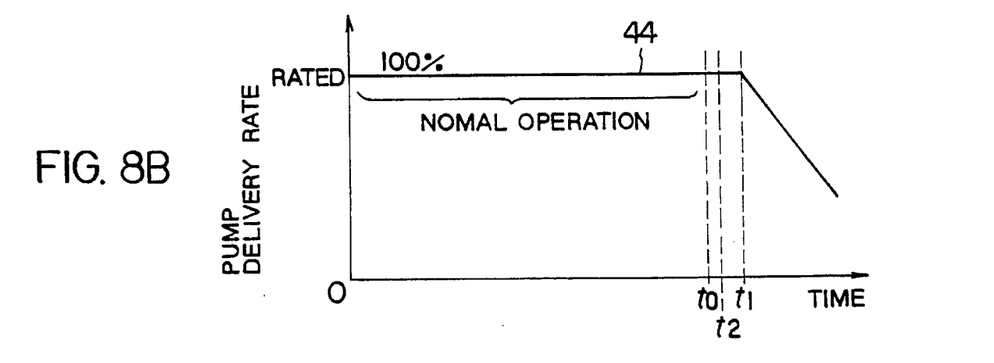

As indicated by a characteristic line 44 in FIG. 8B, the delivery rate of the reactor circulating pump 8 driven by the output voltage from the superconducting energy storage apparatus remains at a rated value even at the time t0 at which breakdown of the in-plant power supply occurs. The rated delivery rate is held until the time t1 and, after the time t1, the pump delivery rate is coasted down at a predetermined rate.

Thus, if the in-plant power supply suffers from the instantaneous power failure at the time t0 and is restored before the time t1, the operation of the reactor circulating pump 8 is affected in no way during the period from the time t0 to the time t1 due to the output voltage from the superconducting energy storage apparatus 41a and the superconducting energy storage apparatus 41b switched over at the time t2, and hence the pump delivery rate is not changed.

In the event of the power breakdown or reactor trip, the rated delivery rate of the pump is maintained by the superconducting energy storage apparatus 41a from the time t0 at which the breakdown of the in-plant power supply occurs to the time t2, and it is then maintained by the superconducting energy storage apparatus 41c from the time t2 to time t1.

After the time t1, the delivery rate of the reactor circulating pump 8 is controlled to gradually coast down by reducing the output voltage from the superconducting energy storage apparatus 41c at a predetermined drop rate.

While this fifth embodiment employs the three superconducting energy storage apparatus 41a to 41c connected in parallel, the number of superconducting energy storage apparatus to be installed will be selected case by case depending on the required capacity, the desired multiple arrangement, etc.

Since the plurality of superconducting energy storage apparatus 41a to 41c are always operated by turns to supply power to the reactor circulating pump 8 and store electric power energy in a repeated manner, the fifth embodiment has high reliability as a compensating power supply apparatus adapted for the breakdown of the in-plant power supply.

According to the present invention, as described hereinabove, a reactor circulating pump can be operated at its rated delivery rate or operated to coast down its delivery rate at a predetermined rate in the event of instantaneous power failure or power breakdown on an in-plant AC bus as a normal power supply for driving the reactor circulating pump, or reactor trip.

As a result, safety and reliability of the nuclear plant operation are remarkably improved. In addition, since the superconducting energy storage apparatus has a relatively small number of movable portions and is compact, the present invention realizes easy maintenance work and greatly contributes to a reduction in size of the plant including the nuclear building.

What is claimed is:

1. A reactor circulating pump system comprising:
   a pump unit for circulating a coolant in a reactor; and
   a power supply means operatively connected to the pump unit for driving the pump unit,
   said power supply means comprising:
   an AC/DC converter and a DC/AC converter provided with an AC voltage/frequency adjuster connected in series between an in-plant AC bus and the pump unit;
   a DC voltage adjuster operatively connected to the input side of the AC/DC converter;
   a superconducting energy storage means operatively connected to the DC voltage adjuster;
   an excitation power supply means disposed in operative association with the superconducting energy storage means; and
   a control means operatively connected to said pump unit, said DC voltage adjuster and said excitation power supply means and adapted to change an AC voltage supplied to the pump unit with a ratio of AC voltage and frequency kept constant in accordance with an information indicating accident thereby for controlling a pump delivery rate to have a predetermined value while holding an output voltage from the superconducting energy storage means at a predetermined value.

2. A reactor circulating pump system according to claim 1, wherein said information indicating an accident is transmitted by a signal representing either one of instantaneous power failure and power breakdown on the in-plant AC bus and reactor trip.

3. A reactor circulating pump system according to claim 1, wherein said superconducting energy storage means is disposed between said DC voltage adjuster and said excitation power supply means.

4. A reactor circulating pump system according to claim 1, wherein said controller is adapted to change the AC voltage supplied to said pump unit with the ratio of the AC voltage and frequency kept constant for controlling the pump delivery rate to have the predetermined value while changing the output voltage from said superconducting energy storage means to a predetermined value.

5. A reactor circulating pump system according to claim 1, wherein said superconducting energy storage means connected to the input side of said DC/AC converter through said DC voltage adjuster is associated with a DC voltage adjuster and a DC/AC converter provided with an AC voltage/frequency adjuster adapted for a control power source and connected in series between an output side of said superconducting energy storage means and said control means.

6. A reactor circulating pump system according to claim 1, wherein another superconducting energy storage means, a DC voltage adjuster and a DC/AC converter provided with an AC voltage/frequency adjuster all adapted for a control power source are connected between said excitation power supply connected to said first mentioned superconducting energy storage means connected to the input side of said DC/AC converter through said DC voltage adjuster and said control means.

7. A reactor circulating pump system according to claim 1, wherein said superconducting energy storage means comprises an heat insulation vessel in which liquid helium fills, a superconducting coil means immersed in the liquid helium and a current terminal to which said superconducting coil means and said excitation power supply means are connected.

8. A reactor circulating pump system comprising:

a pump unit for circulating a coolant in a reactor; and a power supply means operatively connected to the pump unit for driving the pump unit, said power supply means comprising:

an excitation power supply means;

a superconducting energy storage means including a plurality of super conducting energy storage elements connected in parallel to each other;

an AC/DC converter;

a DC/AC converter provided with an AC voltage/frequency adjuster, said excitation power supply means, said superconducting energy storage means, said AC/CD converter and said DC/AC converter being connected in series between an in-plant AC bus and the pump unit with the excitation power supply means being on the in-plant AC bus side and the DC/AC converter being on the pump unit side; and a control means operatively connected to said in-plant AC bus side, said superconducting energy storage means and said pump unit so as to operate by turns to output a power for driving said pump unit, thereby holding a predetermined pump delivery rate in a normal state and to control the pump delivery rate to have a predetermined value in accordance with an information indicating an accident.

9. A reactor circulating pump system according to claim 8, wherein said information indicating an accident is transmitted by a signal representing either one of instantaneous power failure and power breakdown on the in-plant AC bus and reactor trip.

10. A reactor circulating pump system according to claim 8, wherein a plurality of breakers are arranged on input and output sides of said superconducting energy storage elements, respectively.

* * * * *